June 23, 1970  G. C. WOOD ET AL  3,516,237
ADJUSTABLE DRAW BAR FOR SIDE DELIVERY RAKES
Filed May 22, 1968  2 Sheets-Sheet 1
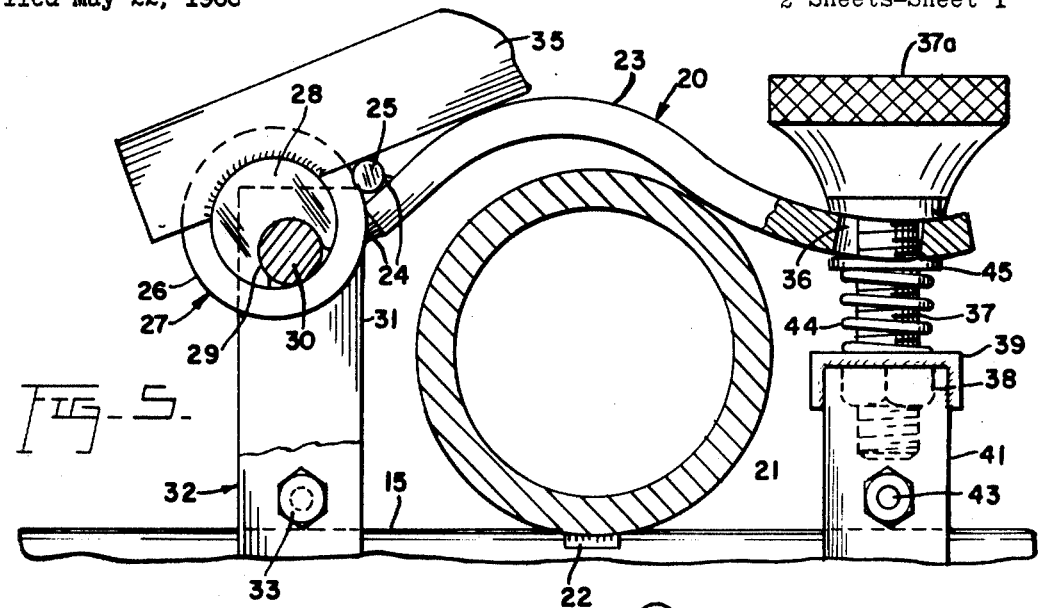
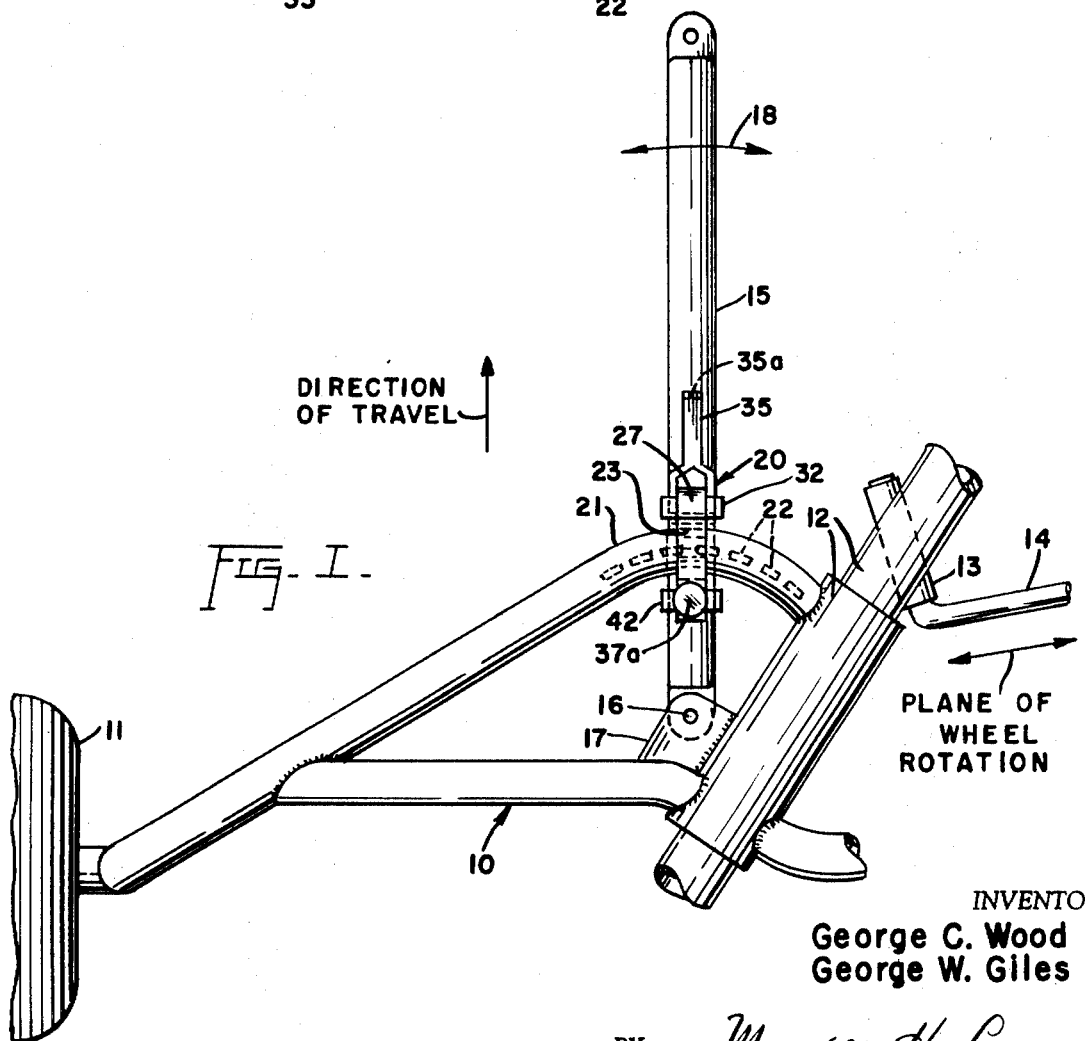
INVENTORS
George C. Wood &
George W. Giles
BY  *Munson H. Lane*
ATTORNEY

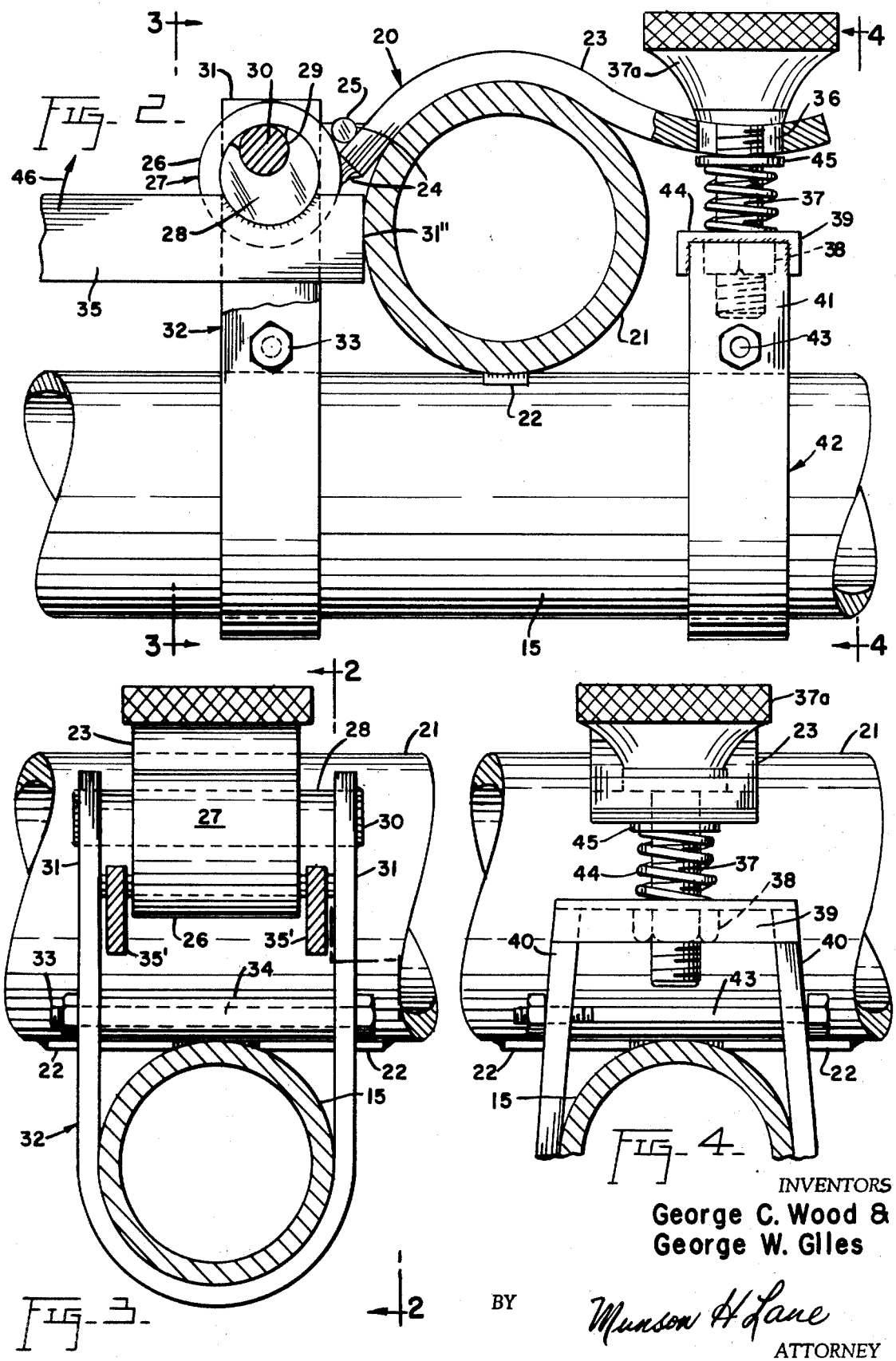

United States Patent Office 3,516,237
Patented June 23, 1970

3,516,237
ADJUSTABLE DRAW BAR FOR SIDE DELIVERY RAKES
George C. Wood, Edenton, and George W. Giles, Raleigh, N.C., assignors to Patent & Development, Incorporated, Raleigh, N.C.
Filed May 22, 1968, Ser. No. 731,059
Int. Cl. A01d *77/06*
U.S. Cl. 56—376                    9 Claims

ABSTRACT OF THE DISCLOSURE

A laterally adjustable draw bar pivoted to an oblique frame member of a side delivery rake so that the angle included between the draw bar and the frame member may be varied. Quick-acting means are provided for releasably locking the draw bar in an adjusted position. The draw bar is movable laterally relative to an arcuate rail on the rake frame, concentric with the draw bar pivot. The quick-acting locking means are provided by a cam-actuated clamping strap which releasably locks the draw bar and rail together. The clamping strap has a screw-threaded adjustment for pre-setting the cam-actuated locking action.

---

This invention relates to new and useful improvements in side delivery rakes of the general type wherein a plurality of rotary raking wheels are supported by an oblique frame member of a wheeled rake frame and wherein the frame is equipped with a draw bar for connecting the rake to a tractor, or the like. In rakes of this general type it is desirable for the draw bar to be laterally adjustable as to the angle included between the draw bar and the oblique frame member, so that the plane of rotation of the raking wheels may be correspondingly varied in relation to the direction of travel of the rake, as dictated by different working conditions. Ordinarily, the draw bar is pivotally connected to the rake frame to facilitate such lateral adjustment, and some type of means are provided for locking the draw bar in an adjusted position.

Usually, the draw bar locking means involve the provision of screw-attached clamps, or bolts or pins selectively inserted in various keeper holes, and the like, and in all such instances an adjustment of the draw bar is a rather complicated procedure which requires the use of tools and wastes valuable time.

The principal object of this invention is to provide, in the structural environment of a draw bar-equipped rake as above outlined, a highly improved, very simple and easily operable device for releasably locking the draw bar in an adjusted position, such a device being quick-acting and capable of being locked or unlocked by manipulation of a simple hand lever, without the use of any tools, loosening or tightening of screws, or repositioning of keeper pins, as is customary in conventional practice.

Another object of the invention is to provide a quick-acting locking device of the aforementioned character which is cam-actuated in response to manipulation of the hand lever, and which includes means for adjusting the cam-actuated locking action so as to compensate for draw bars and frame members of different thicknesses, so that the locking device may be effectively used on rakes of different sizes and types.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIG. 1 is a fragmentary top plan view of a typical side delivery rake equipped with a laterally adjustable draw bar and with the draw bar locking device of the invention;

FIG. 2 is an enlarged, fragmentary view, partly in elevation and partly in vertical section, of the draw bar locking device, taken substantially in the plane of the line 2—2 in FIG. 3;

FIG. 3 is a fragmentary cross-sectional view, taken substantially in the plane of the line 3—3 in FIG. 2;

FIG. 4 is a fragmentary cross-sectional view, taken substantially in the plane of the line 4—4 in FIG. 2; and FIG. 5 is a view, similar to that in FIG. 2, but showing the device in its unlocked position.

Referring now to the accompanying drawings in detail, and more particularly to FIG. 1 thereof, the same illustrates a portion of a typical rotary side deliver rake which may be of any suitable conventional construction. For illustrative purposes, the rake may be of the type disclosed in U.S. patent application Ser. No. 626,853, filed Mar. 29, 1967, now Patent No. 3,389,544, by George C. Wood.

The rake has a frame designated generally as 10, the frame being provided with traveling wheels, one of which appears at 11, the frame including an elongated frame member 12 carrying a plurality of bearings, one of which is shown at 13, each bearing serving to mount a vertically swingable arm 14 supporting a rotatable raking wheel (not shown). The direction of travel of the rake is shown in FIG. 1 which also shows the plane of the raking wheel rotation, it being noted that the frame member 12 is disposed obliquely to the direction of rake travel, as is customary in side delivery rakes.

The rake is pulled, as by a tractor, or the like, in the direction of its travel through the medium of a draw bar 15, which has its rear end connected by a vertical pivot 16 to a bracket 17 secured to the rake frame, the draw bar thus being able to swing laterally as indicated at 18 so as to vary the angle included between the draw bar and the oblique frame member 12 and thus correspondingly vary the plane of raking wheel rotation with respect to the direction of travel of the rake, as required by different operating conditions.

As already noted, the present invention concerns itself primarily with the provision of a quick-acting device for releasably locking the draw bar 15 in an adjusted position. Such a device is designated generally by the reference numeral 20 and is shown in detail in FIGS. 2–5.

The locking device 20 cooperates with an arcuate rail 21 which, for all practical purposes, constitutes a component of the rake frame and which, as the rake frame, may be of tubular construction, being rigidly secured as by welding to the frame member 12. The arcuate rail 21 is concenrtic with the draw bar pivot 16 and crosses the draw bar as the latter extends forwardly from its pivot, such crossing preferably being such that the draw bar passes below or at the underside of the rail 21. However, the draw bar may pass over the top of the rail if the locking device hereinafter described is mounted in an inverted position, if so desired.

In either event, the surface of the rail 21 adjacent the draw bar 15 is provided with a plurality of longitudinally spaced protuberances 22, the spaces between which afford seats for retaining the draw bar in any one of several laterally adjusted positions, as will be apparent, for example, from FIGS. 1 and 3. It will be also apparent that when the draw bar 15 is seated in the space between any two adjacent protuberances 22, it is restrained against lateral swinging movement about the pivot 16, unless the draw bar and the rail 21 are sufficiently separated in the vertical direction so that the protuberances clear the draw bar. In this regard it should be understood that the pivot 16 is sufficiently loose to permit a limited amount of vertical movement of the draw bar, that is, vertically away from the rail 21, for the draw bar to clear the protuberances 22 when the drawbar is to be laterally adjusted. The protuberances 22 may conveniently assume the form of simple strips or lugs secured, as by welding, to the surface of the rail 21 adjacent the draw bar.

The locking device 20 embodies in its construction a reversely curved clamping strap 23 which extends in a direction parallel to the draw bar 15 across the rail 21 and is upwardly convexed so as to fit the rail, as shown in FIG. 2. One end of the clamping strap 23 is secured, as by the welds 24 and a weld-in filler element 25, to a tubular sleeve 26 which constitutes a component of a cam assembly 27. The cam assembly also includes a cylindrical cam member 28 which is rotatably positioned in and projects at both ends from the sleeve 26. The cylindrical cam member 28 is formed with a longitudinally extending, eccentrically disposed socket or channel 29 which rotatably receives a horizontal pin 30, the latter extending between and being secured to a pair of transversely spaced, upwardly projecting ears 31 constituted by the sides of a U-shaped support 32. The latter is in the form of a U-shaped clamp which has its bight portion positioned around the draw bar 15 at a point spaced forwardly from the rail 21, the clamp-like support 32 being held in place on the draw bar by a transverse clamping bolt 33, the bolt 33 preferably having a tubular spacer 34 provided thereon so as to maintain the ears 31 at a fixed distance apart and permit rotation of the cam member 28 on the pin 30 without binding.

The cam assembly 27 is manually actuated by a hand lever or handle 35 having a bifurcated rear end portion 35' which straddles the sleeve 26 and is welded to the end portions of the cam member 28 projecting outwardly from the sleeve, as shown in FIG. 2.

The end portion of the clamping strap 23 remote from the cam assembly 27 is provided with a slot 36 to receive vertically adjustable anchoring means in the form of a screw 37 which has an enlarged, knob-shaped head 37a and extends downwardly through a nut 38 secured within an inverted channel 39. The latter is secured, as by welding, to the upper ends of the side arms 41 of a support 42 which, like the support 32, is in the form of a U-shaped clamp, fastened by a transverse clamping screw 43 to the draw bar 15 at a point spaced rearwardly from the rail 21. If the channel 39 should be in the form of a solid bar of substantial thickness, it may be provided with a screw-threaded bore to receive the screw 37, in which event the nut 38 may be eliminated. A compression spring 44 and a flat washer 45 are positioned on the screw 37 between the clamping strap 23 and the channel 39, as shown.

It is to be noted that the end portion of the strap 23 which receives the screw 37 is downwardly convexed so as to provide a concave upper surface, serving as a seat for a convex bottom surface of the screw head 37a. The screw head is convexed only in one direction, and its engagement with the concavity of the strap 23 normally prevents the screw 37 from turning, unless it is turned by hand for purposes of adjustment, in which event the strap 23 moves slightly downwardly against the action of the spring 44 during each half-turn of the screw as the adjustment is being made.

The operation of the draw bar locking device will be apparent from FIGS. 2 and 5 which show the device respectively in its locked and unlocked positions. Thus, in the locked position of FIG. 2, the handle 35 has been swung downwardly toward the draw bar 15 and the resultant rotation of the cam member 28 has caused the sleeve 26 to move downwardly with respect to the relatively fixed pin 30, so that the upwardly convexed portion of the clamping strap 23 has caused the rail 21 and the draw bar 15 to be clamped together, with the draw bar being seated in the space between two adjacent of the aforementioned protuberances 22, so that the draw bar is positively locked in a desired angular relation to the rake frame member 12 and, consequently, to the plane of rotation of the raking wheels. In this locked position of the device, the anchoring screw 37 may be manually adjusted by turning the screw head 37a so as to raise or lower the adjacent end portion of the clamping strap 23, as may be necessary for a proper clamping engagement of the strap 23 with the rail 21 and in relation to the draw bar 15, particularly on rakes of various sizes and types where the diameters or thicknesses of the rail 21 and draw bar may vary.

In any event, when the angular relationship of the draw bar relative to the rake frame member 12 and the plane of rotation of the raking wheels is to be adjusted, the cam assembly 27 affords quick-acting means for releasing the engagement of the draw bar 15 with the rail 21 under the influence of the clamping strap 23. Thus, the actuating handle 35 is simply raised in the direction of the arrow 46 in FIG. 2 to the position shown in FIG. 5, which causes the cam member 28 to turn on the relatively fixed pin 30, thus raising the sleeve 26 and the associated clamping strap 23 as shown. This, is in turn, permits the draw bar 15 and the rail 21 to become vertically separated to attain a clearance between the draw bar and the protuberances 22 on the rail, whereupon the draw bar may be moved laterally in one direction or the other to its next adjusted position, subject to subsequent locking by the device as already explained in connection wth FIG. 2.

It will be also observed that, as between its locked and unlocked positions as shown in FIGS. 2 and 5, respectively, the cam member 28 is rotated from one side to the other of a vertical plane passing through the center of the fixed pin 30, and thus a toggle action is obtained which automatically locks the cam assembly 27 past dead center, when it is moved to its locked position shown in FIG. 2. In that position the ends of the bifurcations 35' of the handle 35 may come into abutment with the rail 21 as shown in FIG. 2 at 31", whereby to provide stop means to limit the extent to which the hand lever 35 may be lowered toward the draw bar 15. Alternatively, or in addition, the free forward end of the lever 35 may be provided with a depending detent indicated at 35a in FIG. 1, such detent coming into abutment with the draw bar when the lever is lowered and similarly providing such stop means, if so desired.

While in the foregoing there has been shown and described the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention.

What is claimed as new is:

1. In a side delivery rake, the combination of a wheeled frame including an elongated frame member disposed obliquely to the direction of rake travel, and a laterally adjustable draw bar for said frame, said draw bar having a vertical pivot on said frame member and extending forwardly therefrom in the direction of travel, said frame also including an arcuate rail concentric with said pivot and crossing said draw bar, said draw bar being swingable laterally of said arcuate rail about said pivot whereby to vary the angle included between the draw bar and said frame member, and quick-acting means for releasably clamping said draw bar to said rail and thereby locking the draw bar in an adjusted position, said quick-acting clamping means comprising front and rear supports secured at longitudinally spaced points to said draw bar respectively forwardly and rearwardly of said rail, a rotatable cam assembly provided on one of said supports, a clamping strap operatively connected at one end thereof to said cam assembly and spanning said rail in a direction parallel to the draw bar, and means anchoring the other end of said strap to the other of said supports, said cam assembly being operative in a vertical direction between a locked position wherein said strap clamps said draw bar and rail together and an unlocked position wherein the draw bar is free to swing laterally relative to the rail.

2. The device as defined in claim 1 together with detent means reacting between said draw bar and said rail in locking the draw bar in a step-by-step adjusted position when said cam assembly is locked.

3. The device as defined in claim 2 wherein said detent means comprise protuberances provided at longitudinally spaced points on said rail, spaces between said protuberances affording seats for said draw bar.

4. The device is defined in claim 1 together with a manually operable handle connected to said cam assembly for moving the same between its locked and unlocked positions.

5. The device as defined in claim 1 wherein said anchoring means are vertically adjustable relative to said other of said supports.

6. The device as defined in claim 1 wherein said one of said supports includes a pair of spaced ears, said cam assembly comprising a horizontal pin journalled in and extending between said ears, a cylindrical cam member provided with an eccentrically disposed socket receiving said pin therein, and a tubular sleeve rotatably enclosing said cam member, said clamping strap being secured to said sleeve.

7. The device as defined in claim 6 together with a manually operable handle secured to said cam member for rotating the same in said sleeve, whereby to move the cam assembly between its locked and unlocked positions.

8. The device as defined in claim 1 wherein said anchoring means are vertically adjustable relative to said other of said supports and comprise a screw-threaded element carried by said other support, an adjusting screw passing through said clamping strap and operatively engaging said screw-threaded element, said screw being manually operable, and resilient means reacting between said other support and said strap.

9. The device as defined in claim 8 together with means reacting between said adjusting screw and said strap to prevent undesired rotation of the screw.

References Cited

UNITED STATES PATENTS

| | | | |
|---|---|---|---|
| 3,146,571 | 9/1964 | Wood | 56—377 |
| 3,243,945 | 4/1966 | Worrel | 56—377 XR |
| 3,320,735 | 5/1967 | Sutherland et al. | 56—377 |
| 3,389,544 | 6/1968 | Wood | 56—377 |

ROBERT PESHOCK, Primary Examiner

J. A. OLIFF, Assistant Examiner